(12) United States Patent
Noonan

(10) Patent No.: US 11,388,884 B2
(45) Date of Patent: Jul. 19, 2022

(54) DISPOSABLE CAT LITTER BOX SYSTEM

(71) Applicant: Wallace Earl Noonan, Allentown, NJ (US)

(72) Inventor: Wallace Earl Noonan, Allentown, NJ (US)

(*) Notice: Subject to any disclaimer, the term of this patent is extended or adjusted under 35 U.S.C. 154(b) by 221 days.

(21) Appl. No.: 16/602,223

(22) Filed: Aug. 30, 2019

(65) Prior Publication Data

US 2020/0128780 A1    Apr. 30, 2020

Related U.S. Application Data

(60) Provisional application No. 62/766,680, filed on Oct. 31, 2018.

(51) Int. Cl.
*A01K 1/01* (2006.01)
*B65D 5/32* (2006.01)

(52) U.S. Cl.
CPC ............ *A01K 1/0125* (2013.01); *B65D 5/322* (2013.01)

(58) Field of Classification Search
CPC ............................ A41K 1/0107; A41K 1/0125
See application file for complete search history.

(56) References Cited

U.S. PATENT DOCUMENTS

| | | |
|---|---|---|
| 1,384,866 A | 7/1921 | Silvers |
| 3,428,026 A | 2/1969 | Sohmers |
| 3,793,989 A | 2/1974 | Clark |
| 3,872,832 A | 3/1975 | Quinn |
| 4,090,470 A | 5/1978 | Williams |
| 4,305,544 A | 12/1981 | Noonan |
| 4,732,111 A | 3/1988 | Runion |
| 4,800,842 A | 1/1989 | Jones |
| 5,129,364 A | 7/1992 | Randall |
| 5,167,205 A * | 12/1992 | Bell ...................... A01K 1/0125 119/168 |
| 5,220,885 A | 6/1993 | Goetz |
| 5,289,800 A | 3/1994 | Walton |
| 5,572,951 A * | 11/1996 | Evans .................. A01K 1/0125 119/168 |
| 5,655,479 A | 8/1997 | Armington |
| 5,913,282 A | 6/1999 | Indes et al. |
| 6,065,429 A | 5/2000 | Crosse |
| 6,487,990 B1 * | 12/2002 | McNew ............... A01K 1/0125 119/168 |
| 7,594,480 B2 | 9/2009 | Cressy |
| 10,117,960 B2 | 11/2018 | Noonan |

FOREIGN PATENT DOCUMENTS

WO    WO-9418822 A1 *    9/1994    ........... A01K 1/0125

* cited by examiner

*Primary Examiner* — Daniel J Colilla

(57) ABSTRACT

A disposable cat litter box system convertible from an open box to a covered box with an attachable hood and air treating devices. Said air treating device comprises an access opening in the box upper wall member going to an absorbent material to be liquid dosed with cat products. Said absorbent material is secured to the inside surface of the upper wall member covering the access opening. Said hood comprises a fold-line creased paperboard or plastic flat blank, erected into an attachable hood having a horizontal locking bottom flap, opposing vertical side walls and horizontal top wall secured to the cat box by the horizontal locking bottom flap and spreadable, tensioned elastic bands. Included is a method to reuse the disposable cat litter box by opening and closing one end of the cat box to pour out used litter and refill with new litter.

18 Claims, 10 Drawing Sheets

DISPOSABLE CAT LITTER BOX SYSTEM

FIELD OF THE INVENTION

This invention relates to the field of pet sanitary stations and particularly to a disposable cat litter box system that comprises: 1) convertible from an open cat litter box to a covered cat litter box depending on the cat's preference, 2) one or more air treating devices for odor control, 3) a reusable attachable hood to support the odor control, provide for privacy of the cat and hide the litter contents, and 4) a method of reusing the used disposable cat litter box by opening either end for pouring out the used cat litter into a trash receptacle and reclosing the open end to refill the cat litter box with new cat litter.

DESCRIPTION OF PRIOR ART

Perhaps the most unpleasant experiences that pet owners have with cats has to do with the cat litter box and such unpleasantries as: 1) very difficult to clean and change the smelly cat litter box, 2) living with unpleasant cat litter box odors, and 3) having to police-up litter being scattered out of the box.

To alleviate the unpleasant problem of having to clean the cat litter box, a paperboard company in the '70's marketed a collapsed, waterproof, paperboard, disposable cat litter box that the pet owner just threw-away, eliminating cleaning and changing the smelly cat litter box. The disposable cat litter box comprised when erected a horizontal bottom wall integral with four rigid vertical walls. The pet owner added the cat litter. The problems were: 1) there was no odor control, 2) there was no hood for those cats who would use a covered box to support the odor control, provide privacy for the cat, and hide the cat litter contents, and 3) cats could scatter the litter out of the box.

Then in the December, 1981, U.S. Pat. No. 4,305,544 to Noonan A Disposable Cat Litter Holding Means provided a large collapsed, waterproof, paperboard, disposable cat litter box comprising when erected a horizontal bottom wall integral with four interlocked vertical walls, each vertical wall integral with a horizontal upper wall member that extended inwardly over the cat litter to prevent the cat scattering litter out of the box. The problems were: 1) there was no odor control, and 2) there was no hood for those cats who would use a covered box, Then in the later 70's cat litter manufacturers added scented cat litter for odor control and in the 'mid-'80's cat litter manufacturers offered a new litter for cat litter odor control that contained sodium bentonite, a natural clay that absorbs up to 15-times its weight in liquid and forms litter clumps holding the absorbed cat urine liquid. The pet owner removes the litter clumps and replenishes them with fresh litter. The problems with clumping cat litters are the fine powders that can effect a cats pulmonary organs, and premium clumping, scented cat litters are substantially more expensive than regular, non-clumping, unscented clay cat litter. With a price difference of 100%-600% between premium and regular clay cat litters (Shoprite Supermarkets, Hamilton, N.J.), and cat litter manufacturers recommending pet owners fill their cat litter box with 3"-4" high (15 lbs-18 lbs) of litter for a large box, plus the cat owner having to continually replenish the removed premium litter clumps with additional fresh litter, there is a substantial costs savings for a pet owner who can use a substantially less expensive, regular, natural, unscented and non-clumping clay cat litter or other inexpensive litter alternatives with a good cat litter box odor control system.

Therefore, understanding that the most unpleasant experiences pet owners have with cats is all the unpleasantries of the cat litter box, there exist a definite need for a disposable cat litter box system comprising all the benefits for: 1) disposability, eliminating the unpleasant cleaning and changing of the smelly cat litter box, 2) odor control eliminating the cat litter box odors between cat litter changes, 3) convertibility for the pet owner to be able to use the disposable cat litter box as an open box for those cats who will not use a covered box, or as a covered box using an attachable hood for those cats that have no preference, 4) anti-littering protection to prevent cats from scattering litter out of the box, and 5) a disposable cat litter box system comprising all the above benefits enabling the pet owner to use economical, regular, natural, non-clumping, unscented clay cat litter or other economical litter alternatives and eliminate the costly premium clumping, scented cat litters. The present invention adds the following new invented apparatuses to said U.S. Pat. No. 4,305,544 comprising: 1) an integral odor control system, and 2) a reusable attachable hood.

Removing the unpleasant smell of a dirty cat litter box continues to plague pet owners. Products such as automated cat litter boxes, scoopable cat litter, deodorizing cat litter, scented cat litter and additives such as baking soda and activated charcoal are some of the popular current remedies to remove the smell directly from within the cat litter. However, for cat owners who use these remedies, but do not change the basic litter and wash out and disinfect the cat pan, or cat pan attachments from a few weeks up to a month, the unpleasant smell of dirty cat litter, dirty cat pan and attachments can permeate the entire room where the cat litter box is located.

Additional deodorizing remedies that work on the odor emanating from the dirty litter are aerosol sprays, gels, solid deodorizers and according to a manufacturer of furniture enclosures for cat litter boxes, a titanium dioxide (TiO2) coating applied to the interior walls of the enclosure in conjunction with a 24/7 blue light wave technology inside the enclosure. The problems with these products are: 1) the aerosols and sprays only deodorize the odors temporarily, 2) the gels and solid deodorizers are usually placed in the general vicinity of the cat litter box and their effectiveness is diluted, because they do not attack the smelly odors at the source, but only after the odors have already entered the room where the cat litter box is located, and 3) the TiO2 blue wave technology only works in totally enclosed cat litter boxes where many cats will not enter, and requires additional expense for the electricity to power the blue light 24/7, and the replacement costs for the blue light devices.

Only a few of the current odor eliminating products are designed to be attached directly to the top of an open cat litter box where they work continuously on the air above the dirty cat litter. There are two types of these devices, consisting of powered and non-powered. One such powered product is offered by The LitterMaid Company which is a fan that attaches vertically to the top of the cat litter box wall and draws the air from above the dirty cat litter through an activated charcoal screen to deodorize it. The problem with this method is the constant 24/7 use of electricity to power the fan and the constant noise of the fan. One such non-powered product is offered by Compac Industries with their Orna-Scent non-powered air freshener that hooks onto a vertical wall of an open, non-enclosed cat litter box and provides a deodorizing air freshener for the dirty cat litter.

The problem with this product is that only the hook secured to the top of the vertical wall is near the top of the cat litter box, while the air freshener body hangs down vertically towards the floor on the outside of the cat litter box and away from the top of the cat litter box and the dirty cat litter where the dirty odors are emanating. Also, another non-powered device, U.S. Pat. No. 10,117,960 B2 to Noonan for An Air Treating Apparatus for Pet Sanitary Stations and Methods of Mounting and Liquid Dosing Said Apparatus, Nov. 6, 2018, illustrates one or more attachable air treating apparatuses mounted to the outside surface of the four approximately horizontal upper wall members that are integral or attached to the vertical walls of the disposable cat litter box. The pet owner doses each air treating apparatus with a small amount of an odor eliminating product, or other cat remedy product whose evaporating fragrance treats the air above the cat litter. The present invention improves on the above patent with an air treating device not exposed to the exterior or interior of the cat litter box, where a cat could rip, or scratch said device while digging, clawing, or scratching either the exterior, or the interior of the cat litter box, or both.

When we examine patents comprising one or more integral air treating devices mounted to a predetermined area on the inside surface of the horizontal upper wall members that are integral or attached to the top of the vertical walls of the cat litter box, I am not aware of existing prior art where: 1) a cat cannot rip or scratch the air treating devices when digging, scratching, or clawing in an open cat litter box, or within the cat litter box with an attached hood, 2) said air treating devices can be easily and quickly liquid dosed with cat products from outside of said horizontal upper wall members for both the open disposable cat litter box, or when within the covered box, and 3) when wanting to service the covered cat litter box, the attached hood can be easily and quickly folded-away to the outer side of the box, exposing the open box for policing the litter and refreshing the air treating devices.

U.S. Pat. No. 7,594,480, "Deodorizer/Disinfectant Fluid Treatment System and Litter Liner for use therewith", to Cressy, Sep. 29, 2009, uses a conduit strip within a cat pan liner to diffuse a disinfectant fluid into the cat litter where it is absorbed. This system is located under the litter, requires a powered source consisting of an Ozone Generator, which requires the extra expense of electricity to power the system, and it emits a noise related to the operating generator.

U.S. Pat. No. 5,289,800, "Waste Odor Eliminator Cover for a Cat Waste Box", to Walton, Mar. 1, 1994, illustrates a dome mounted over a cat litter box with several slots in the dome ceiling that have charcoal filters to clear the warm fecal odor rising from the dirty cat litter as it rises into the cooler room air. This invention is not designed to use a liquid air freshener or liquid odor eliminator as the means to deodorize the dirty cat litter odor, but rather to use an enclosure to surround the cat litter box and direct by convection the warm fecal odors in the cat litter box upwards through the cleaning charcoal filters mounted in the top of the enclosure and out into the cool air of the room.

U.S. Pat. No. 5,220,885, "Litter Box", to Goetz, Jun. 22, 1993, uses an air freshener compartment in the upper ceiling section of a molded enclosed structure that houses a cat litter box. The air freshener deodorizes rising unpleasant odors from a dirty cat litter box as they rise to the enclosure's ceiling and escape through the slotted air freshener compartment into the room air. This invention is designed for a solid air freshener, because if the pet owner applied a liquid dose to an overhead absorbent material, the liquid could drip through the slots onto the cat.

U.S. Pat. No. 5,129,364, "A One-Piece Disposable Cat Litter Box", to Randall, Jul. 14, 1992, illustrates a disposable cat litter box made from a single piece of cardboard with a charcoal filter mounted in the upper roof. This invention is designed to be a full enclosure disposable cat litter box and is not designed to deodorize the dirty cat litter odors using a liquid air freshener or liquid odor eliminator, but rather to clean the smelly air with charcoal filters as the air rises through the filters into the room.

U.S. Pat. No. 4,305,544, "Disposable Cat Litter Holding Means", to Noonan, Dec. 19, 1981, shows a one-piece, integral die-cut and fold-line creased paperboard blank formed into an erected disposable cat litter box with upward extending vertical walls integral with approximately horizontal, inwardly extending upper wall members that are approximately parallel to the bottom wall. However, the upper wall members do not have mounted liquid dosed air treating devices whose evaporating fragrance or aroma treats the air above the cat litter.

U.S. Pat. No. 4,090,470, "Litter Box", to Williams, May 23, 1978, uses a deodorizing disinfecting element impregnated in an absorbent material that is within a housing underneath the cat litter box. Perforations in the housing allow the deodorizing disinfecting vapors to evaporate into the air. The problem with this invention is the housing that holds the absorbing material is underneath the cat litter box, which is hard to get at to replace or refresh, because you have to lift the litter box off a supporting structure and unscrew the housing to get at the absorbent material.

U.S. Pat. No. 3,872,832, "Indoor Cat House", to Quinn, Mar. 25, 1975, uses a furniture look alike enclosed structure for housing a cat litter box with a deodorizer mounted in the inside upper corner of the enclosure. This deodorizing structure would be difficult to change or refresh since it is inside of the enclosure up in the corner.

U.S. Pat. No. 3,793,989, "Deodorized Pet Relief Station", to Clark, Feb. 26, 1974, uses a mounted deodorizing structural assembly mounted to the end wall of an enclosed cat litter box where a wick receives deodorizing liquid from a container and disperses the air freshener fragrance within the enclosure. The problem with this invention is that the enclosure has to be taken apart to service the fragrance dispensing unit.

U.S. Pat. No. 3,428,026, "Fumigated Pet House", to Sohmers et al, February 1969, uses a deodorant tray mounted on the outside roof of the pet house to communicate with the interior roof through closely spaced holes in the floor of the tray. The tray enclosure prevents the cat from coming in contact with the deodorant form, while deodorant vapors evaporate into the enclosure through holes in the tray. The problem with this invention is that the pet owner has to manually remove the deodorant form from the deodorant tray to refresh the form and then return it to the tray permitting possible skin irritants in the deodorant to come in contact with the pet owners skin.

U.S. Pat. No. 1,384,866, "Disinfecting Brooders", to Silvers, Jul. 19, 1921, provides a liquid disinfectant reservoir in the roof of a brooder house. Vapors from the disinfectant evaporate and enter the brooder enclosure through elongated slots in the enclosure. This invention would be very dangerous for cats, because cats move around in an enclosure and hit the interior walls, which could agitate the liquid in the overhead reservoir and cause it to spill through the elongated slots down onto the cat.

U.S. Pat. No. 6,065,429 Disposable cat litter box waste receptacle assembly with enclosure to Crosse, May 23, 2000, illustrates a disposable cat litter box system comprising a disposable cat litter filled litter latrine that is inserted into a box tray. A litter privacy enclosure cover is placed over the litter latrine and snuggley between the litter latrine and the box tray. A self-adhesive deodorizing device is affixed on the inside vertical wall of the litter privacy enclosure above the cat litter. The problems are: 1) the self-adhesive deodorizing device is exposed to the cat scratching and clawing on the inside of the latrine privacy enclosure, 2) the deodorizing device is not adjustable to gently introduce a cat to the new fragrance, but rather the fragrance may be too concentrated and overwhelming to the cat when first smelling the fragrance, causing the cat to avoid the litter box system, and 3) to police the cat litter and replace the deodorizing device, the pet owner has to completely remove the latrine privacy enclosure from the box tray.

U.S. Pat. No. 5,655,479 Lightweight Disposable Kitty Litter Box Method, to Armington, Aug. 12, 1997, illustrates decorative houses that surround a disposable cat litter box, and a decorative house that mounts to the top of the vertical walls of the disposable cat litter box. The only odor control system to eliminate the cat urine odors are odor eliminating impregnated paper strips that substitute for the scented and clumping cat litter, and to service the disposable cat litter box, it must be removed from the decorative house.

U.S. Pat. No. 5,913,282 Pet Litter Box, to Indes et al, Jan. 22, 1999, and U.S. Pat. No. 4,800,842 Disposable pet sanitary station having a fixed lower compartment and an expandable upper compartment, to Jones, Jan. 31, 1989, both illustrate a disposable cat litter box system having a fixed lower compartment and an expandable upper compartment. There is no odor control system to eliminate the cat litter box odors and the upper compartment cannot be removed or folded-away to expose the entire disposable cat litter box for policing the cat litter.

U.S. Pat. No. 4,732,111 to Runion, May 22, 1988, Disposable Cat Litter Box, illustrates a disposable cat litter box assembly comprising a filled disposable cat litter box with an accordion folded poly bag attached and a permanent housing enclosure. The pet owner removes a top-cover from the disposable cat litter box exposing the cat litter and then slides the filled disposable cat litter box into the housing. When it is time to change the box, the pet owner removes the used disposable cat litter box from the housing while the accordion folded polybag simultaneously surrounds the withdrawing disposable cat litter box for disposal. The problem is there is no odor control system to remove the cat litter box odors, and the housing enclosure does not permit the pet owner to open it to service the disposable cat litter box.

In conclusion, insofar as I am aware, the present invention provides a means for overcoming these prior art difficulties.

SUMMARY OF THE INVENTION

A disposable cat litter box system convertible from an open cat litter box to a covered cat litter box depending on the cat's preference. Said disposable cat litter box system comprises: 1) one or more air treating devices for cat box odor control, or other cat remedies, 2) anti-littering protection to prevent the cat scattering litter out of the cat litter box, 3) a reusable, attachable hood to support the odor control, provide for the privacy of the cat, and hide the litter contents, and 4) a method to reuse the disposable cat litter box.

The present invention comprises a disposable cat litter box, formed of a one or more piece, die-cut and creased waterproof paperboard or plastic blank, that when erected into a disposable cat litter box comprises a horizontal bottom wall that extends to the bottom wall edges having integral transversal fold-lines and integral longitudinal fold-lines. A plurality of upward extending end walls integral to the bottom wall, each end wall having an integral or attached upper end wall member with end wall securing devices, and an end wall fold-line scored between the end wall and the upper end wall member, wherein the bottom wall transversal fold-lines are scored between the bottom wall and the end wall. A plurality of upward extending side walls integral to the bottom wall, each side wall having an integral or attached upper side wall member with side wall securing devices. A side wall fold-line is scored between the side wall and upper side wall member, wherein the bottom wall longitudinal fold-lines are scored between the bottom wall and the side walls.

Corner end flaps are integral with the side walls and corner end flap securing devices, wherein each of the corner end flaps having a corner end flap transversal fold-line scored between each of the corner end flaps and each side wall, and a plurality of die-cuts between the corner end flaps and the side walls. The end flaps are adapted to be interlocked inside the upwardly extending end walls. The upper end wall members including said securing devices such as tabs are adapted to interlock with the upper side wall member securing devices such as slots to form an upper interlocking device for holding the upper end wall members extending inwardly, approximately horizontal over the bottom wall.

Said upper wall members comprise one or more integral air treating devices, each device having an integral predetermined sized access opening in said upper wall member that goes completely through the upper wall member to the absorbent material. A predetermined sized absorbent material covers the upper wall member's inside surface access opening and said absorbent material's size is larger than the access opening and is secured to said inside surface by an adhering substance attached to the inside surface area surrounding the access opening. The pet owner dispenses a liquid cat box odor control product and/or a liquid cat remedy product from a container into the air treating device, where said liquid's evaporating fragrance or aroma treats the air above the cat litter.

A second embodiment of the air treating device comprises adhesively zone coated absorbent material mounted to the inside surface of the upper wall member where said absorbent material covering the access opening is absent of any adhesive in order to be absorbent of liquid dosed cat products To prevent a cat from ripping, scratching, or dislodging the air treating device when entering, or exiting the cat litter box, or when playing, scratching, digging, or burying in the cat litter, said air treating device is mounted on the inside surface of the horizontal, or approximately horizontal upper side wall member and is positioned in a predetermined area between said upper side wall member and said upper end wall member. A second embodiment of said air treating device mounted on the inside surface of the horizontal, or approximately horizontal upper side and/or upper end wall member covering said access opening is positioned on the inside surface of said upper wall member between the upper wall member and the top edge of the vertical wall of the cat litter box.

The present invention comprises a reusable attachable hood for covering the open cat litter box, comprising a predetermined sized fold-line creased paperboard or plastic flat blank erected into the attachable hood. Said hood having means to cover the open cat litter box, comprising integral opposing vertical side walls and a horizontal top wall, and means to secure one vertical side wall to the cat litter box, comprising an integral horizontal bottom locking flap device that extends inwardly from said integral vertical side wall and under one side of cat litter box. One or more spreadable tensioned elastic bands press the hood opposing vertical side walls against the cat litter box opposing vertical side walls.

The present invention includes a method of opening and closing one end of the disposable cat litter box to pour out the used cat litter into a trash receptacle, and reclose the box to refill with new litter.

OBJECTS OF THE INVENTION

It is an object of the present invention to provide the pet owner with said disposable cat litter box system comprising one or more air treating devices that are mounted to approximately horizontal upper wall members that are integral or attached to the top of the vertical walls of the disposable cat litter box, enabling the pet owner to easily and quickly dispense a small amount of a liquid odor eliminating product into the air treating device. The evaporating fragrance from the dispensed liquid product permeates out from the air treating device and treats the air above the cat litter by eliminating the cat urine and feces odors before they enter the room.

It is an object of the present invention to provide the pet owner with said disposable cat litter box system comprising said one or more air treating devices mounted to the inside surface of the approximately horizontal upper wall members of the cat litter box, wherein said air treating devices are mounted higher than the top of the litter to more effectively treat the air above the cat litter.

It is an object of the present invention to provide pet owners with a disposable cat litter box system comprising a method to either fully dispose of the used disposable cat litter box into a trash receptacle, or in an emergency a method to reuse the disposable cat litter box by opening one end to pour out the used cat litter into a trash receptacle, and then reclose and refill the box with new litter.

It is an object of the present invention to provide the pet owner with said disposable cat litter box system comprising said one or more air treating devices mounted to the inside surface of the approximately horizontal upper wall members of the cat litter box, wherein one or more of the air treating devices can be liquid dosed daily, or when policing the litter, or as needed, with an odor eliminating, cat attractant, or other liquid cat remedy product, whose evaporating fragrance or aroma will permeate out from the air treating device to treat the air above the cat litter.

It is an object of the present invention to provide the pet owner with said disposable cat litter box system comprising said one or more air treating devices mounted to the inside surface of the approximately horizontal upper wall members of the cat litter box, wherein the air treating device can be liquid dosed with a small amount of cat attractant product whose evaporating aroma will treat the air above the cat litter box to attract those cats who have poor sanitation habits to use the litter box instead of doing their business outside the box.

It is an object of the present invention to provide the pet owner with said disposable cat litter box system comprising one or more air treating devices mounted to the inside surface of the approximately horizontal upper wall members of the cat litter box, wherein multiple air treating devices can be liquid dosed with the same or different cat products, such as an odor eliminator in one or more devices, a cat attractant in one or more devices, and other cat products in one or more devices, enabling the busy pet owner to multi-task different needs of the pet owner and/or the cat.

It is an object of the present invention to provide the pet owner with said disposable cat litter box system comprising one or more air treating devices mounted to the inside surface of the approximately horizontal upper wall members of the cat litter box, wherein said air treating device is absent of any liquid product until the pet owner begins to dispense the liquid product onto an absorbent material of the air treating device.

It is an object of the present invention to provide the pet owner with said disposable cat litter box system comprising said one or more air treating devices mounted to the inside surface of the approximately horizontal upper wall members of the cat litter box, wherein the pet owner has a method to gently introduce a cat to a new fragrance or aroma in the air treating device by dosing each device one-at-a-time until the cat is familiar with the new fragrance.

It is an object of the present invention to provide the pet owner with said disposable cat litter box system comprising one or more air treating devices mounted to the inside surface of the approximately horizontal upper wall members of the cat litter box, wherein the pet owner can adjust the liquid dosing regimen to enable the evaporating fragrance or aroma to be effective in treating the air above the cat litter box as the litter gets older.

It is an object of the present invention to provide the pet owner with said disposable cat litter box system comprising said one or more air treating devices mounted to the inside surface of the approximately horizontal upper wall members of the cat litter box to keep the air above the cat litter smelling clean and fresh using substantially less expensive, natural, non-clumping, unscented clay cat litter, or other inexpensive litter alternatives eliminating spending substantially more for the premium clumping, scented cat litters.

It is an object of the present invention to provide the pet owner with said disposable cat litter box system comprising said one or more air treating devices mounted to the inside surface of the approximately horizontal upper wall members of the cat litter box, wherein said approximately horizontal upper wall members also act as an anti-littering protection feature preventing the cat from scattering litter outside the box. Now a pet owner can use said cat litter box, comprising four reasonable height vertical walls combined with the anti-littering horizontal upper wall member protection, enabling a cat to easily enter and exit over a vertical wall of said cat litter box that is filled with the litter manufacturers recommended 4" height of litter for the cat to dig, claw and bury in, without having the pet owner worry about the litter being scattered outside the cat litter box.

It is an object of the present invention to provide the pet owner with said disposable cat litter box system comprising one or more air treating devices mounted to the inside surface of the approximately horizontal upper wall members of the cat litter box to keep the air above the cat litter smelling clean and fresh, and to help those cats whose pet owners skimp on the correct amount of a scented, scooping litter to put in the box, because of the litter's expense. Now, using an inexpensive, regular, natural, non-clumping, unscented clay litter, or other inexpensive litter alternative the pet owner can fill the cat litter box to the recommended height of 4", enabling the cat to dig, scratch and bury the feces in the litter.

It is an object of the present invention to provide the pet owner with said disposable cat litter box system comprising one or more air treating devices mounted to the inside surface of the approximately horizontal upper wall members of the cat litter box, wherein the pet owner can liquid dose the devices daily, or when policing the cat litter, or as needed to keep the air above the litter smelling clean and fresh 24/7.

It is an object of the present invention to provide the pet owner with said disposable cat litter box system comprising said one or more air treating devices mounted to the inside surface of the approximately horizontal upper wall members, wherein the disposable cat litter box can be converted to a covered box with a reusable, attachable hood, enabling the pet owner the flexibility to use the disposable cat litter box as an open box for those cats who will only enter an open box, or as a covered box for those cats that have no preference.

It is an object of the present invention to provide the pet owner with said disposable cat litter box system comprising one or more air treating devices mounted to the inside surface of the upper wall members, wherein the pet owner has: 1) a method to attach and cover the open disposable cat litter box with the reusable, attachable hood, and 2) a method to quickly and easily fold-away and secure the hood walls to the outer side of the cat litter box to police the litter and refresh the air treating devices whose evaporating fragrance or aroma treats the air above the cat litter.

It is an object of the present invention to provide the pet owner with said disposable cat litter box system comprising one or more air treating devices mounted to the inside surface of the approximately horizontal upper wall members of the cat litter box, wherein when the hood walls are folded and secured to the outer side of the cat litter box and pressed against a stationary room wall, or other stationary room object, said folded walls collapse into a compact, approximate vertical orientation against the outer side of the cat litter box and stationary room wall, or other stationary room object to save room space.

It is an object of the present invention to provide the pet owner with said disposable cat litter box system comprising one or more air treating devices mounted to the inside surface of the approximately horizontal upper wall members of the cat litter box, wherein the air treating device is non-powered, eliminating the noise and electricity costs of powered units and the costs to replace the devices operated by electricity.

It is an object of the present invention to provide the pet owner with said disposable cat litter box system comprising one or more air treating devices mounted to the inside surface of the approximately horizontal upper wall members of the cat litter box, wherein said air treating device is not exposed to the exterior or interior of the cat litter box where a cat could rip, scratch and dislodge the exposed device when entering or exiting the cat litter box, or when scratching, digging or burying in the cat litter box.

It is an object of the present invention to provide the pet owner with said disposable cat litter box system comprising said one or more air treating devices mounted to the inside surface of the approximately horizontal upper wall members of the cat litter box, wherein the combination of said air treating devices to treat the air above the cat litter, and said reusable, attachable hood for the privacy of the cat and to hide the cat litter contents will enable the pet owner to use the disposable cat litter box system in most rooms of the house, apartment, or while traveling, or vacationing.

It is an object of the present invention to provide the pet owner with said disposable cat litter box system comprising said one or more air treating devices mounted to the inside surface of the approximately horizontal upper wall members of the cat litter box, wherein said air treating devices treat the cat box odors above the litter, not in it. This enables the pet owner to use inexpensive, regular, natural, unscented, non-clumping clay cat litter or other inexpensive litter alternative and eliminate perhaps 50%, or more of all the scooping time needed to remove all the clumps of premium clumping litter containing cat urine.

It is an object of the present invention to provide the pet owner with said disposable cat litter box system comprising said one or more air treating devices mounted to the inside surface of the approximately horizontal upper wall members of the cat litter box, wherein said air treating device system enables the pet owner to use a natural clay cat litter, or natural litter alternatives containing no chemical additives that a cat would physically come in contact with.

It is an object of the present invention to provide the pet owner with said disposable cat litter box system comprising said one or more air treating devices mounted to the inside surface of the approximately horizontal upper wall members of the cat litter box, wherein said air treating devices are mounted in an easily accessible predetermined location enabling the pet owner to quickly and easily liquid dose said devices from either open end of the hood without having to adjust or remove the hood.

It is an object of the present invention to provide the pet owner with said disposable cat litter box system comprising said one or more air treating devices mounted to the inside surface of the approximately horizontal upper wall members of the cat litter box, wherein said: 1) disposable cat litter box, 2) the air treating devices and 3) the reusable, attachable hood have been designed to be of minimal material and manufacturing expense in order to be sold and used as a disposable.

BRIEF DESCRIPTION OF THE DRAWINGS

FIG. 3—FIGS. 1 & 2 Erected into a Disposable Cat Litter Box with Method of Dosing Air Treating Devices.

DESCRIPTION OF THE SPECIFICATIONS

Figure 1:
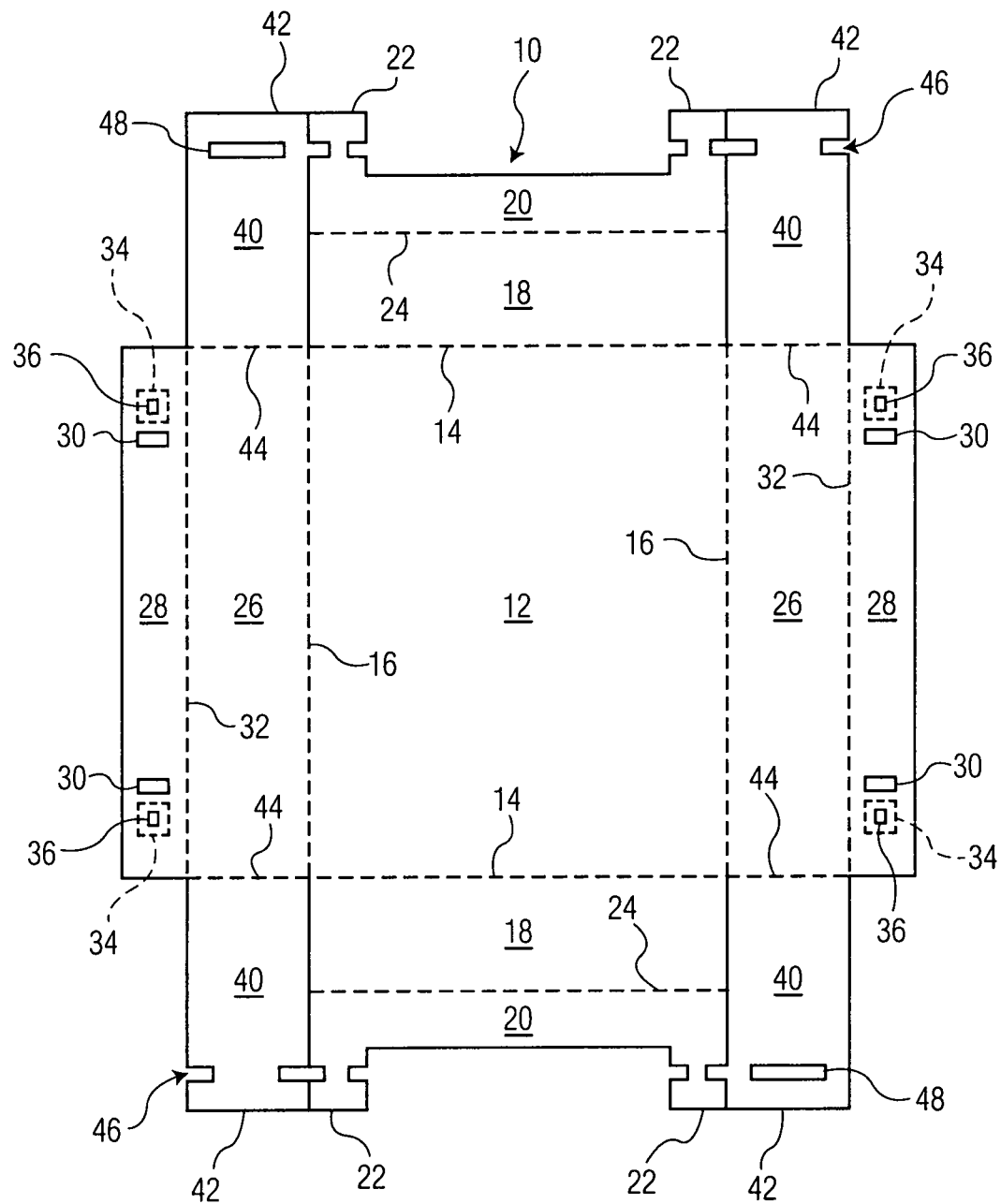
FIG. 1—Top-View of Die-Cut & Fold-Line Creased Flat Blank with Air Treating Devices.

FIG. 1 illustrates the outside surface top-view of a one-piece, die-cut and fold-line creased, flat paperboard blank 10 having a bottom wall 12 extending horizontally to the bottom wall edges comprising transversal fold-lines 14 and longitudinal fold-lines 16. A plurality of end walls 18 integral to the bottom wall 12, each end wall 18 having an integral upper end wall member 20 with end wall securing devices 22, and end wall fold-line 24 scored between the end wall 18 and the upper end wall member 20 wherein the bottom wall transversal fold-lines 14 are scored between the bottom wall 12 and the end walls 18. A plurality of side walls 26 integral to the bottom side wall 12, each side wall 26 having an integral upper side wall member 28 with side wall securing devices 30, a side wall fold-line 32 scored between the side wall 26 and the upper side wall member 28, wherein the bottom wall longitudinal fold-lines 16 are scored between the bottom wall 12 and the side walls 26. Said upper wall members 20/28 comprise the top-view of air treating device 34 (not seen in upper wall member 20) having an integral predetermined sized access opening 36 that goes completely through the upper wall members 20/28 to a predetermined sized absorbent material 38 (not seen) that is mounted with adhesive to the inside surface of the upper wall members 20/28. Corner end flaps 40 integral with the side walls 26 and corner end flap securing devices 42, wherein each of the corner end flaps 40 having a corner end flap transversal fold-line 44 scored between each of the corner end flaps 40 and each side wall 26. A plurality of die-cuts 46/48 are between the corner end flaps 40 and the side walls 26.

Figure 2:
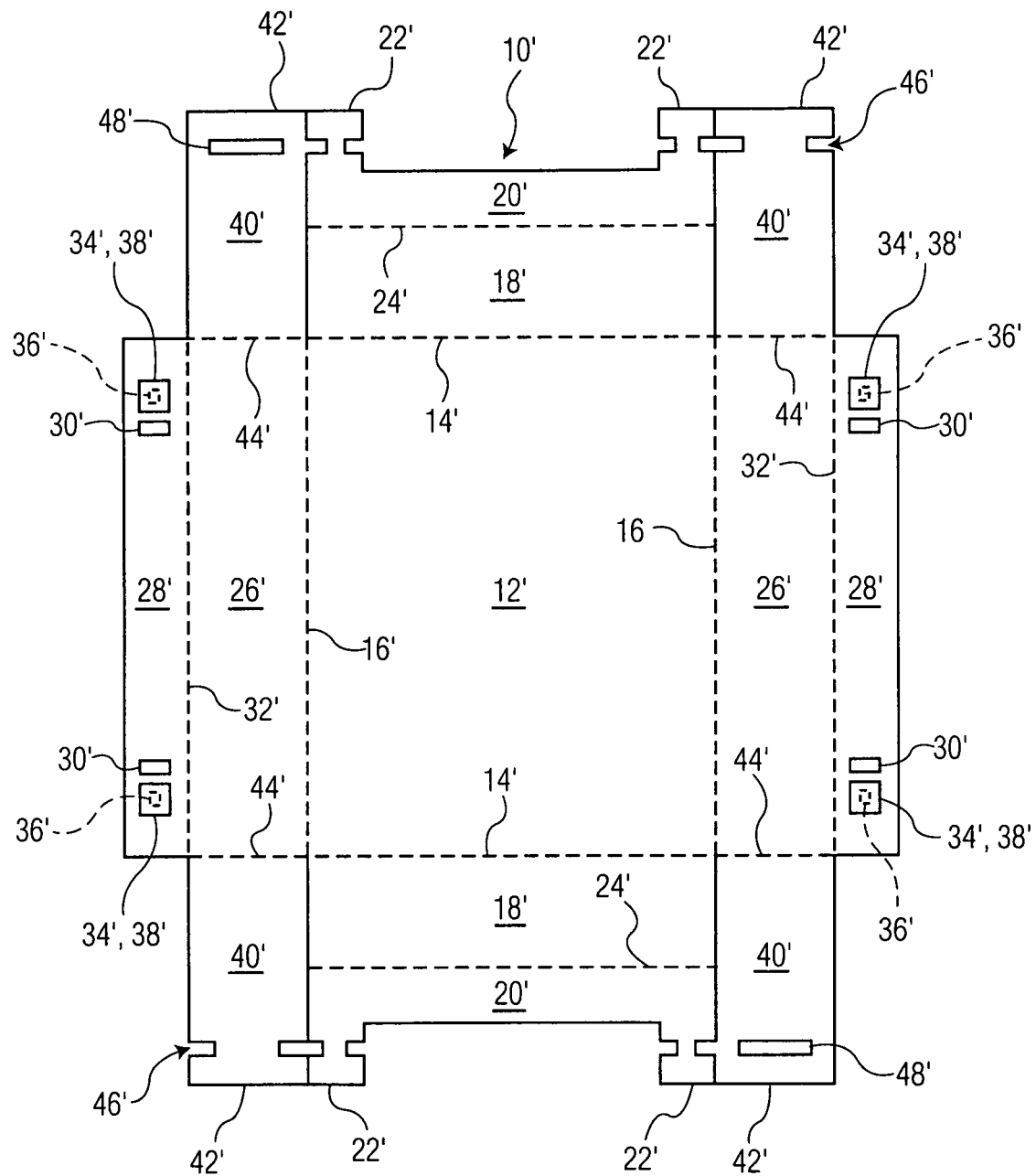
FIG. 2—Bottom View of Die-Cut & Fold-Line Creased Flat Blank with Air Treating Devices.

FIG. 2, illustrates the waterproof protected inside surface bottom view of said die-cut and fold-line creased flat blank 10' comprising a one-piece, diecut and fold-line creased, protected, flat paperboard blank 10' having a bottom wall 12' extending horizontally to the bottom wall edges comprising transversal fold-lines 14' and longitudinal fold-lines 16'. A plurality of end walls 18' integral to the bottom wall 12', each end wall 18' having an integral upper end wall member 20' with end wall securing devices 22', and end wall fold-line 24' scored between the end wall 18' and the upper end wall member 20' wherein the bottom wall transversal fold-lines 14' are scored between the bottom wall 12' and the end walls 18'. A plurality of side walls 26' integral to the bottom wall 12', each side wall 26' having an integral upper side wall member 28' with side wall securing devices 30', a side wall fold-line 32' scored between the side wall 26' and the upper side wall member 28', wherein the bottom wall longitudinal fold-lines 16' are scored between the bottom wall 12' and the side walls 26'. Said upper wall members 20'/28' comprise the bottom view inside surface of said air treating device 34' (not seen in upper wall member 20') having a predetermined sized absorbent material 38' that is mounted with an adhesive to the inside surface of the upper wall members 20'/28' and covers the predetermined size access opening 36' (not seen) in the upper wall members 20'/28'. Corner end flaps 40' integral with the side walls 26' and corner end flap securing devices 42', wherein each of the corner end flaps 40' having a corner end flap transversal fold-line 44' scored between each of the corner end flaps 40' and each side wall 26'. A plurality of die-cuts 46'/48' are between the corner end flaps 40' and the side walls 26'.

Figure 3:
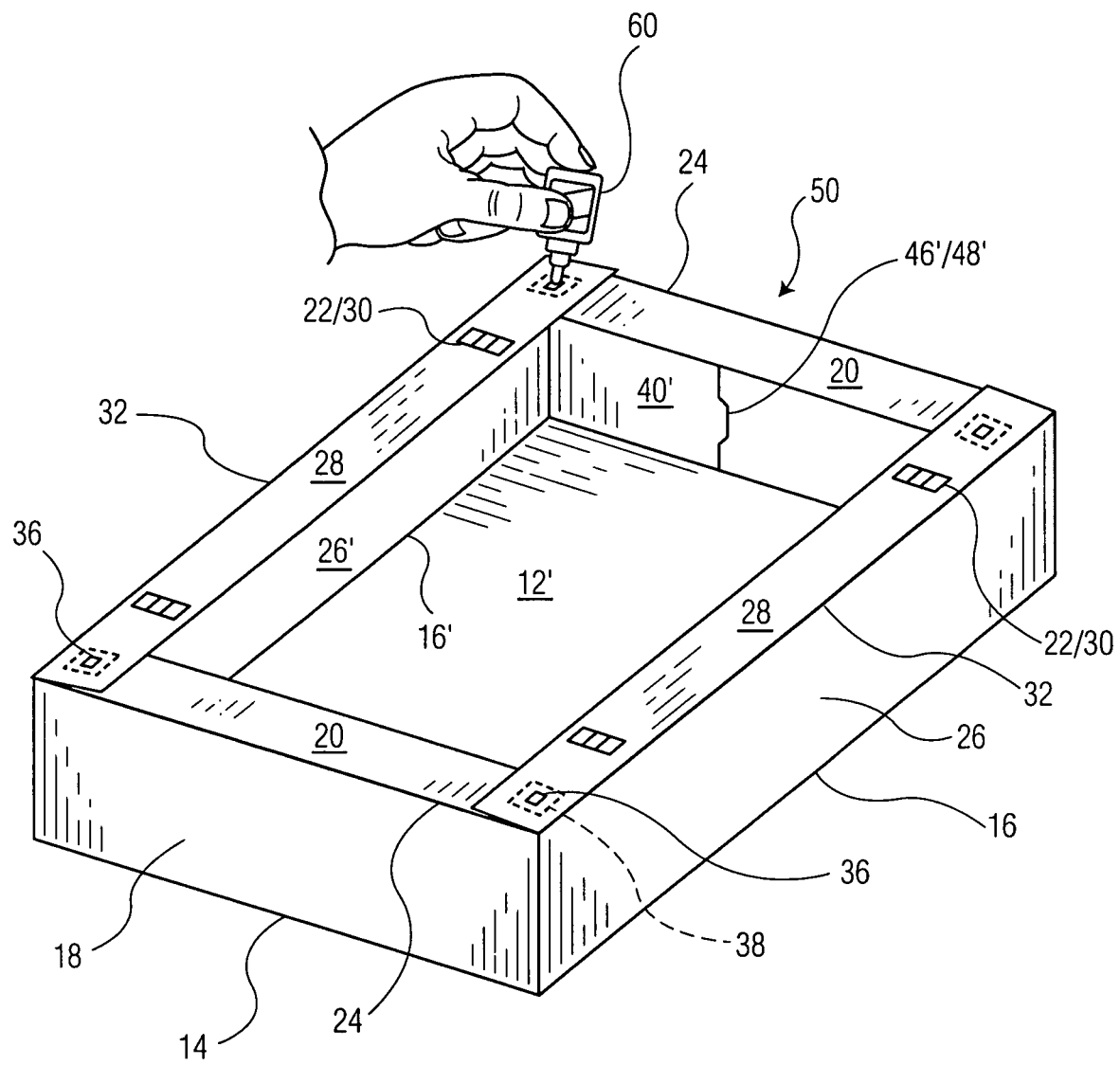

FIG. 3, illustrates the die-cut and creased, waterproof protected, flat paperboard blank 10 of FIGS. 1 and 2, erected into the disposable cat litter box 50 comprising horizontal bottom wall 12' extending horizontally to transversal fold-lines 14/14' (14' not seen) integral with upward extending end walls 18/18' (18' not seen) and longitudinal fold-lines 16/16' integral with upward extending side walls 26/26'. The plurality of end walls 18/18' (18' not seen) integral to the bottom wall 12' each end wall 18/18' (18' not seen) having an integral upper end wall member 20 with end wall securing tab devices 22 and end wall fold-line 24 scored between end wall 18 and the upper end wall member 20. The bottom wall transversal fold-lines 14/14' (14' not seen) are scored between the bottom wall 12' and the end walls 18/18' (18' not seen). The plurality of side walls 26/26' integral to the bottom wall 12', each side wall 26/26' having an integral upper side wall member 28 with side wall slot securing devices 30 and side wall fold-line 32 scored between the side wall 26/26' and the upper side wall member 28. Said upper side wall members 28 comprising one or more air treating devices 34/36 (38' not seen) extend inwardly from the upward extending side walls 26/26' over and parallel to the bottom wall 12'. The end flaps 40' (40 not seen) including end flap tab and slot securing devices 46'48' are adapted to be interlocked inside the upwardly extending end walls 18/18' (18' not seen) such that when the end walls 18 are folded upwardly and the end wall members 20 are folded inwardly, approximately horizontal, a downward bias will be exerted on the interlocked end flaps 40' (40 not seen) to cause them to be secured in position and retain the overall structure of the disposable cat litter box 50. The upper end wall members 20 include upper securing tab devices 22 adapted to interlock with upper side wall members 28 securing slot devices 30 to form an upper interlocking device for holding the upper end wall members 20 extending inwardly, approximately horizontal over the bottom wall 12' and to further bias the interlocked end flaps 40/40' (40 not seen) into a vertical extending position to cause overall rigidity of the disposable cat litter box 50. The interlocking of the upper tabs 22 into the upper slots 30 defined in the upper side wall members 28 serves to give significantly additional strength to the side walls 26/26' structure of the disposable cat litter box 50. FIG. 3 also illustrates the quick and easy method of liquid dosing the air treating device 34 access opening 36 with container 60 from outside the upper wall member 28. FIG. 3, also illustrates how air treating device 34 is not exposed to the exterior or interior of the cat litter box 50 prohibiting a cat from ripping, scratching or dislodging said air treating device 34 when entering or exiting the cat litter box 50, or when scratching, digging or playing in the cat litter in the interior of the cat litter box 50.

Figure 4:
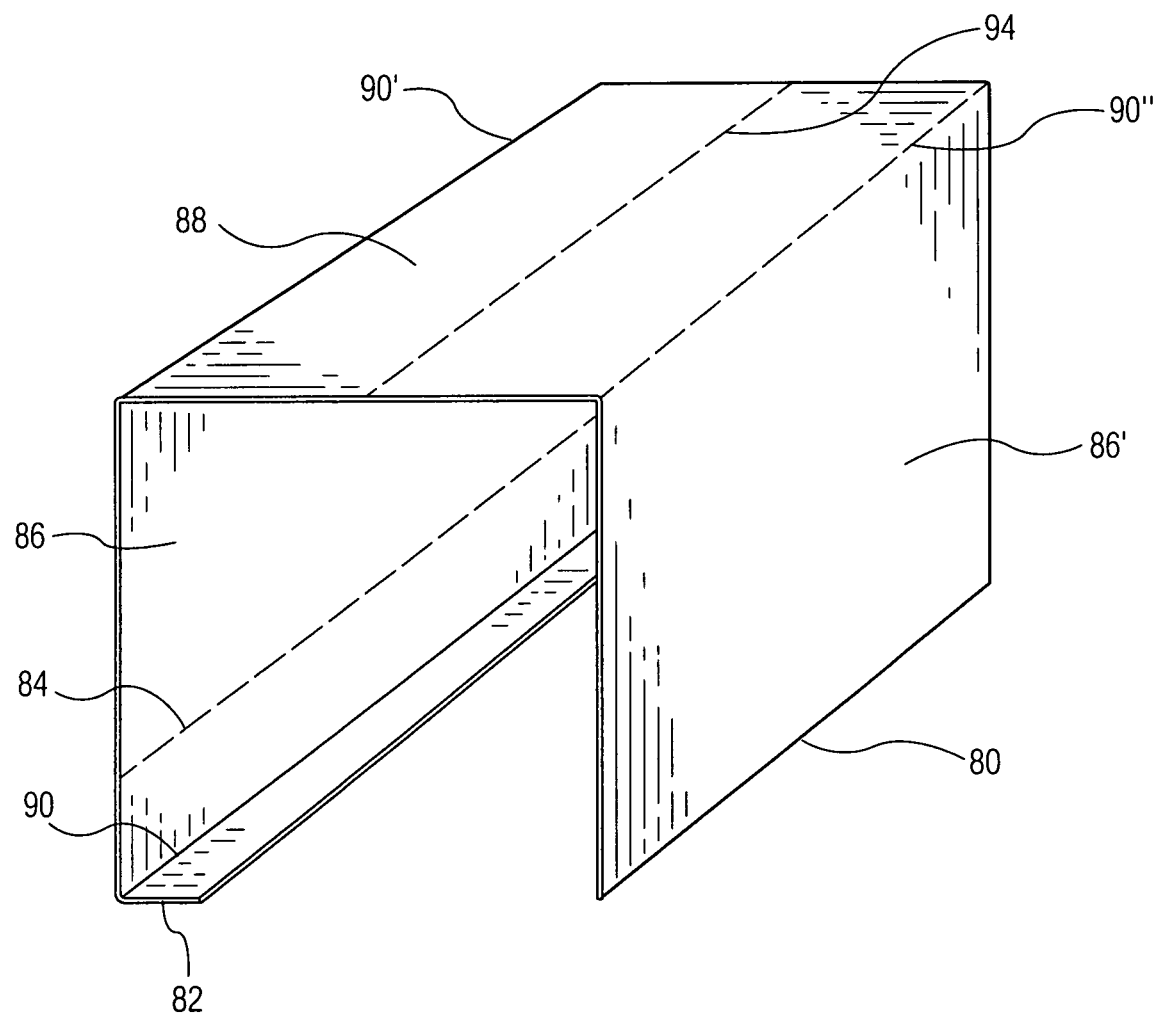
FIG. 4—Erected Attachable Hood.

FIG. 4, illustrates attachable hood 80 erected from a fold-line creased flat blank of a paperboard, or plastic material, comprising when erected a hood 80 horizontal locking bottom flap 82 that extends horizontally to integral longitudinal fold-line crease 90 integral with vertical sidewall 86 that extends upward to integral longitudinal fold-line crease 90' that is integral with horizontal top wall 88 that extends horizontally to integral longitudinal fold-line crease 94 that is positioned to fold horizontal top wall 88 into two approximately equal integral longitudinal sections when folding the hood walls to the outer vertical side wall 26 of cat litter box 50 (not seen). Horizontal top wall 88 extends to integral opposing longitudinal fold-line crease 90" that is integral to opposing vertical side wall 86'. Vertical side wall 86 also comprises a predetermined positioned longitudinal reverse fold-line crease 84 on the outside of vertical side wall 86 located at the approximate height of the cat litter box 50.

Figure 5:
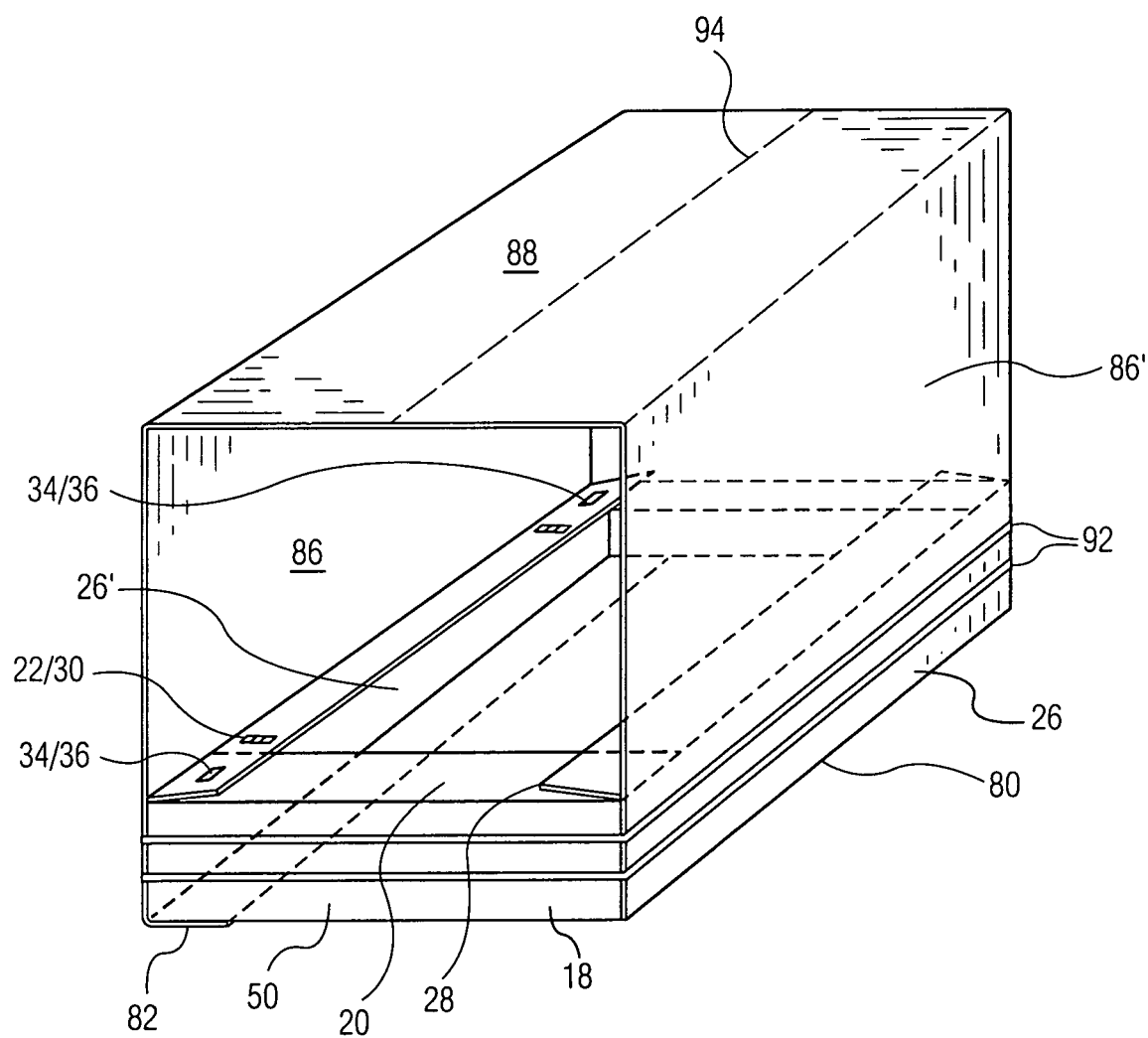
FIG. 5—Attached Hood covering the Disposable Cat Litter Box.

FIG. 5, illustrates attachable erected hood 80 installed over erected cat litter box 50 with the hood 80 horizontal locking bottom flap 82 that will be firmly secured under cat litter box 50 from the weight of the cat litter in cat litter box 50. One or more predetermined sized elastic, spreadable bands 92 are stretched approximately horizontally along the lower portion of hood 80 vertical side walls 86/86' and the vertical end walls 18/18' (18' not seen) of cat litter box 50. Said one or more elastic, spreadable bands 92 press the vertical side walls 86/86' of hood 80 tightly against the vertical side walls 26/26' of cat litter box 50 to secure the hood 80 to the cat litter box 50. The hooded cat litter box 50/80 comprising one or more air treating devices 34 is then used to support the odor control, provide for the cat's privacy, and hide the cat litter contents, enabling the disposable cat litter box system to be used in most rooms of the home, or apartment.

Figure 6:
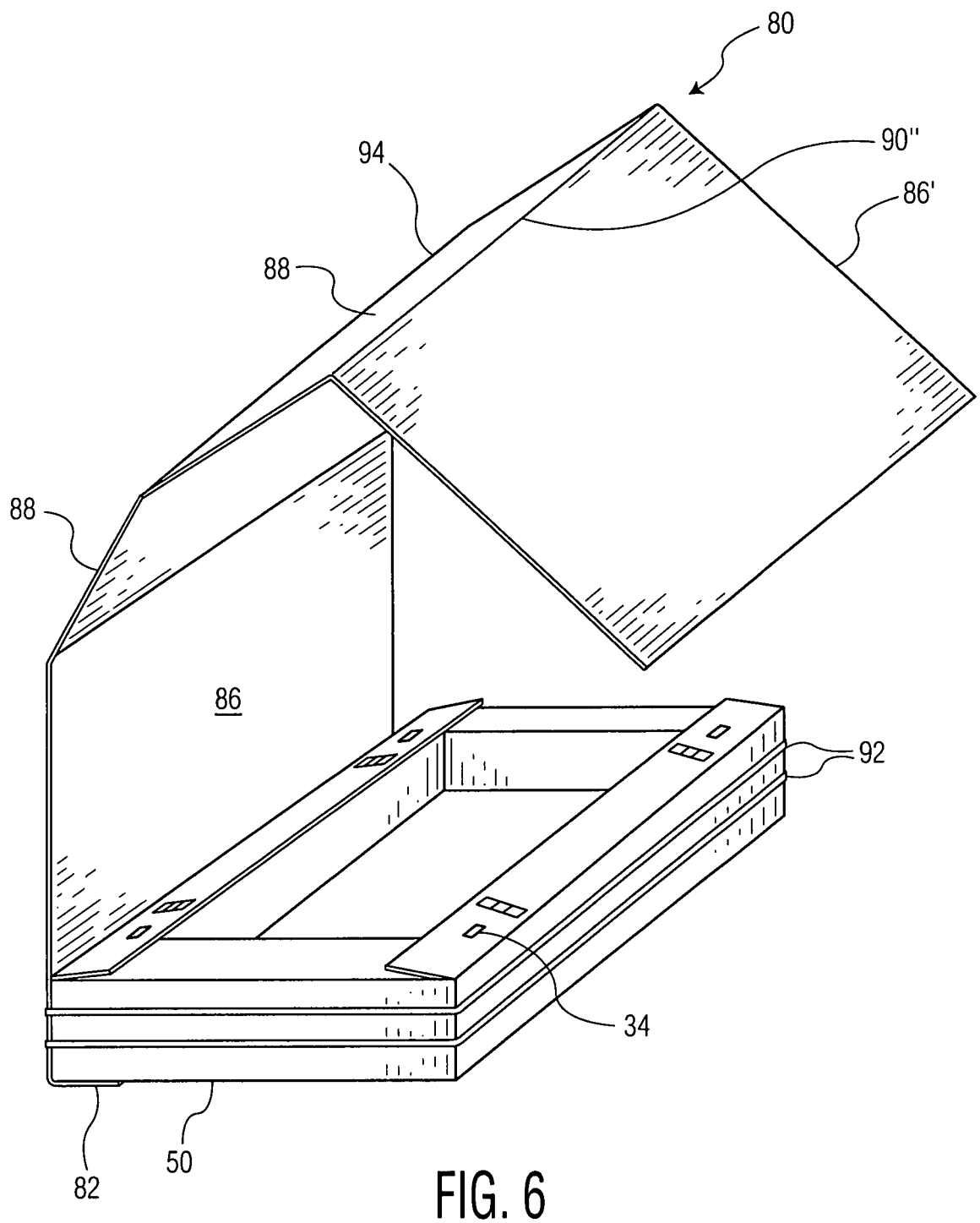
FIG. 6—Beginning Method to Open Attached Hood.

FIG. 6, illustrates the beginning of the method to easily and quickly fold-away hood 80 from cat litter box 50 in order to police the cat litter and to refresh the air treating devices 34 by dispensing into the air treating devices 34 from container 60 (not seen) a small amount of a liquid product whose evaporating fragrance or aroma treats the air above the cat litter to eliminate cat box odors, or for other remedies for a cat. Said beginning of the method comprises the pet owner spreading the one or more tensioned, elastic, spreadable bands 92 away from the vertical side wall 86' of hood 80 and lifting the vertical side wall 86' of hood 80 above and away from the tensioned, elastic, spreadable bands 92.

Figure 7:
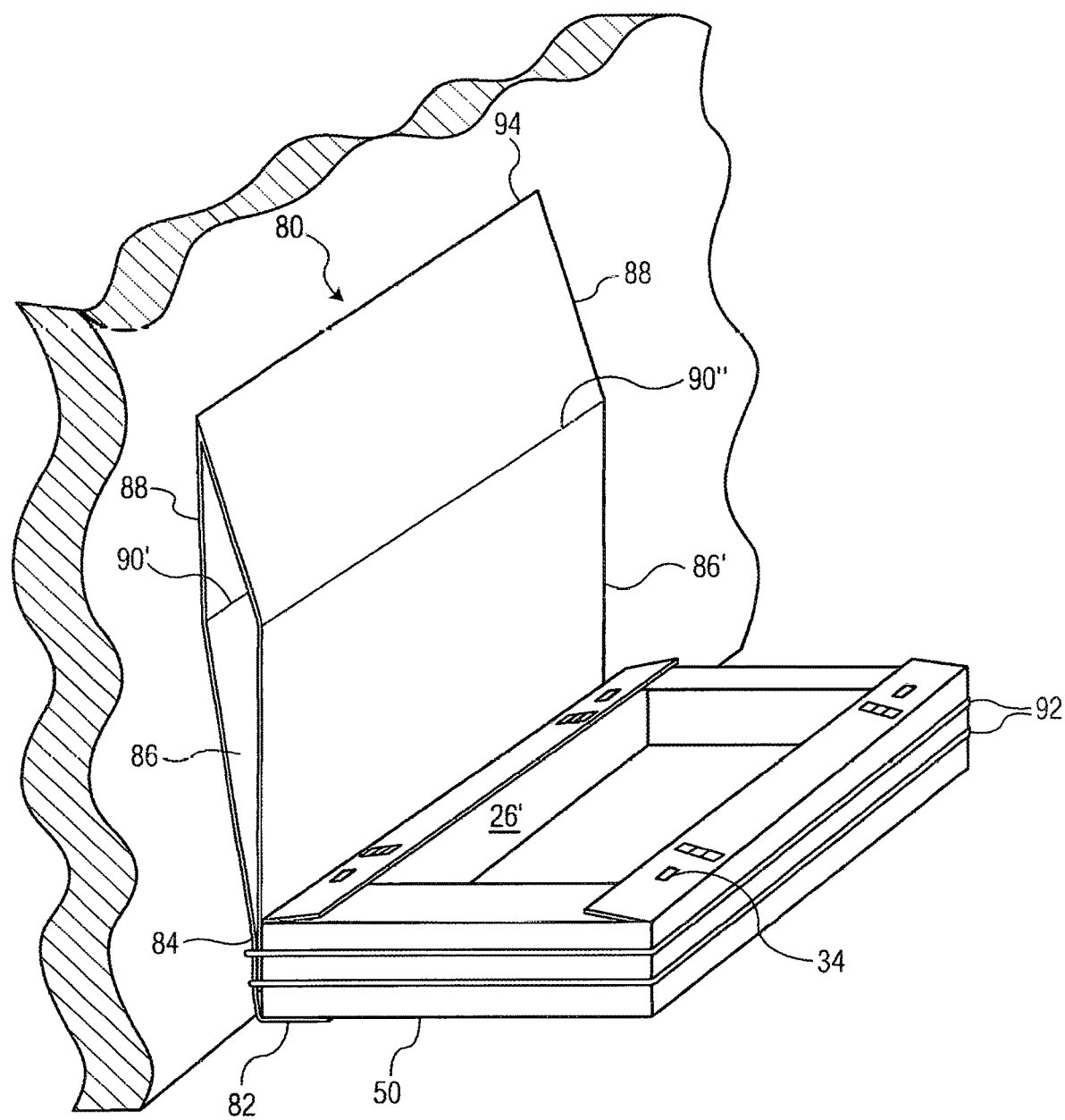
FIG. 7—Opened and Secured Folded Attached Hood.

FIG. 7, illustrates the continuation of the method illustrated in FIG. 6, where the pet owner easily and quickly folds-away lifted vertical side wall 86' of hood 80 from cat litter box 50 and uses the vertical side wall 86 integral predetermined positioned longitudinal reverse fold-line crease 84 (not seen), that is approximately level with the top of the vertical side wall 26 (not seen) of cat litter box 50 to fold outwardly vertical side wall 86 at said crease 84 opening an area between hood side wall 86 and outer vertical side wall 26 of cat litter box 50 where said pet owner inserts and secures opposing hood vertical side wall 86' integral with the folded hood walls 88/86 into said open area and closes said area by the pressing of said one or more tensioned elastic bands 92 against said hood 80 folded walls 86/86' that are simultaneously pressed against said outer vertical side wall 26 of cat litter box 50 securing said folded hood walls 86/88/86' against the outer side of cat litter box 50. The pet owner then polices the cat litter and refreshes the air treating devices 34 as needed of cat litter box 50 by dispensing from container 60 (not seen) a small amount of a liquid product whose evaporating fragrance or aroma treats the air above the cat litter to eliminate cat box odors, or for other cat remedies.

Figure 8:
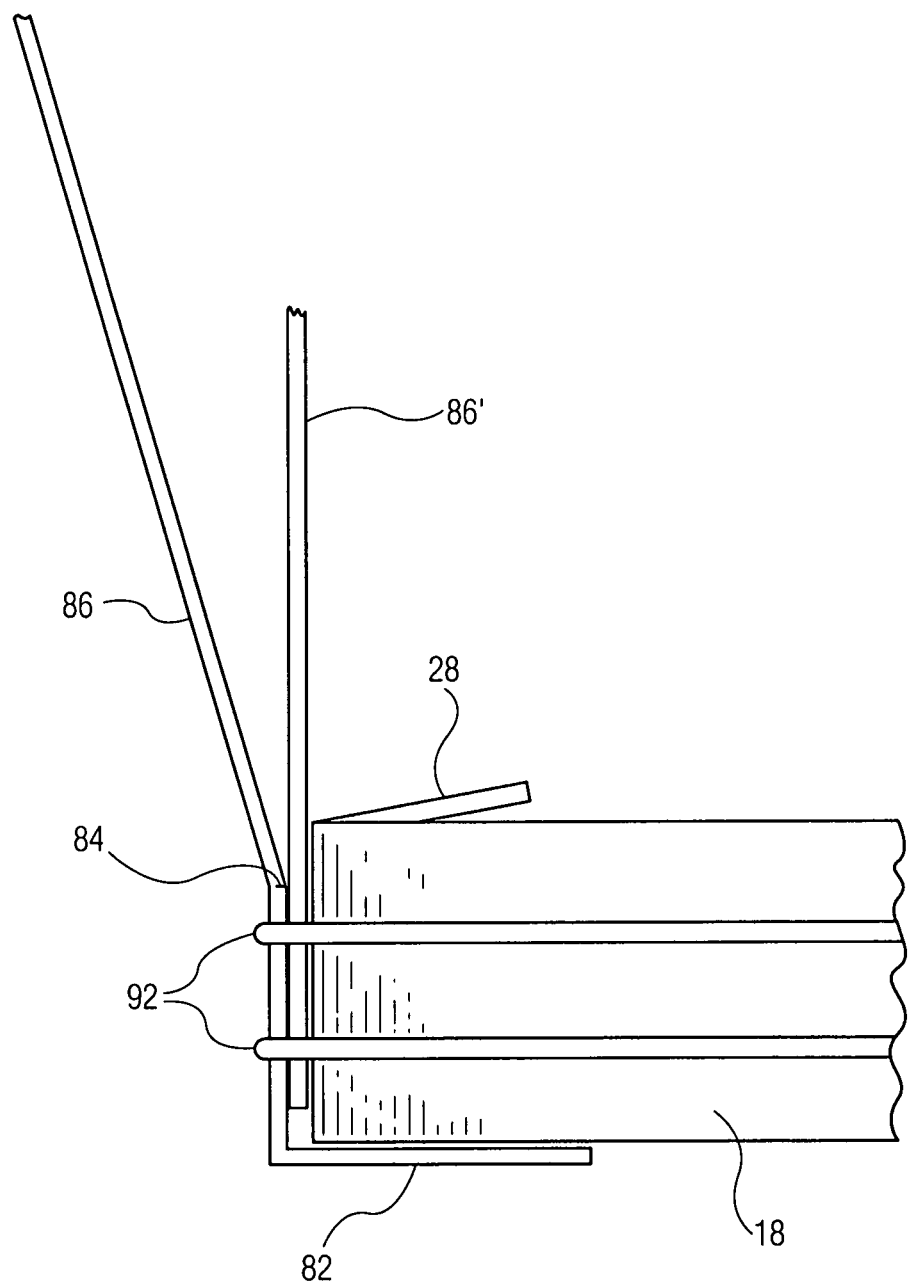
FIG. 8—Side-View of Folded and Secured Attached Hood Mechanism.

FIG. 8, illustrates an end view in FIG. 7, of the mechanism for inserting and securing the hood 80 folded walls 86/86' into an open area adjacent with said outer vertical side wall 26 (not seen) of the cat litter box 50. Said end-view illustrates said one or more spreadable, tensioned, elastic bands 92 prior to the bands pressing said folded hood walls tightly against said outer vertical side wall 26 of cat litter box 50.

Figure 9:
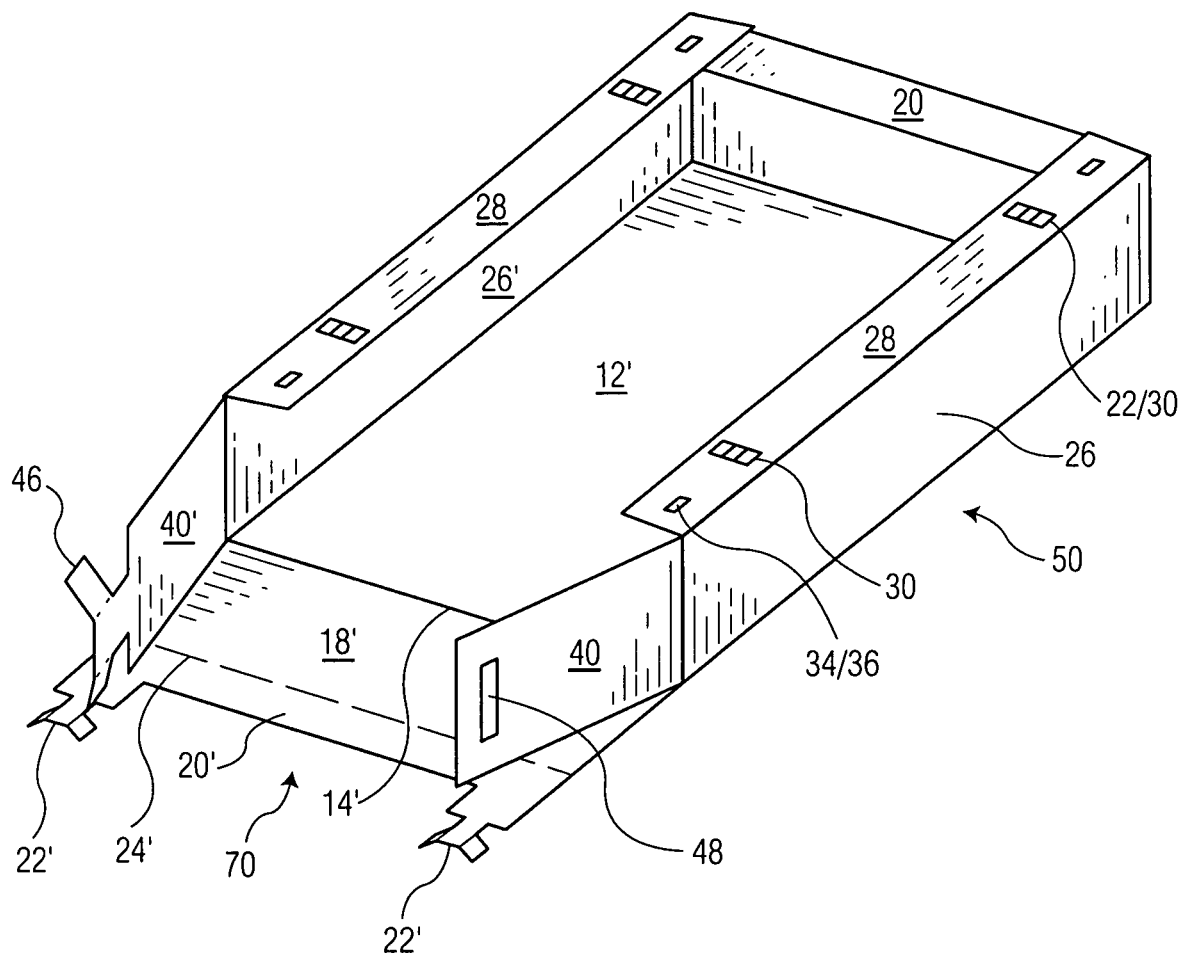
FIG. 9—Open & Closing End of the Disposable Cat Litter Box.

FIG. 9, illustrates the open configuration of one of the convertible open and closing ends 70 of the disposable cat litter box 50, for emptying the used cat litter by pouring it out of one end of the cat litter box into a trash recepticle. A method to open the convertible open and closing end 70 comprises unlocking one or both pairs of interlocked tabs 22 of one or both end walls 18/18' (18 not seen) from the interlocked slots 30 of opposing upper side wall members 28. Then, folding-away at the fold line 14', said end wall 18', integral upper end wall member 20', and integral opened interlocking tabs 22', exposes the interlocked corner end flaps 40/40' with interlocking tab and slot 46/48 for unlocking (not seen). Then once tab and slot 46/48 are unlocked, positioning said end wall 18', said integral upper end wall member 20', said opened interlocking tabs 22', said corner end flaps 40/40' and said opened interlocking tab and slot 46/48 into a three-sided shaped discharge chute with the end wall 18', integral upper end wall member 20' and opened interlocking tabs 22' being the chute bottom wall, and the corner end flaps 40/40' with opened interlocking tab and slot 46/48 being the chute opposing side walls.

Figure 10:
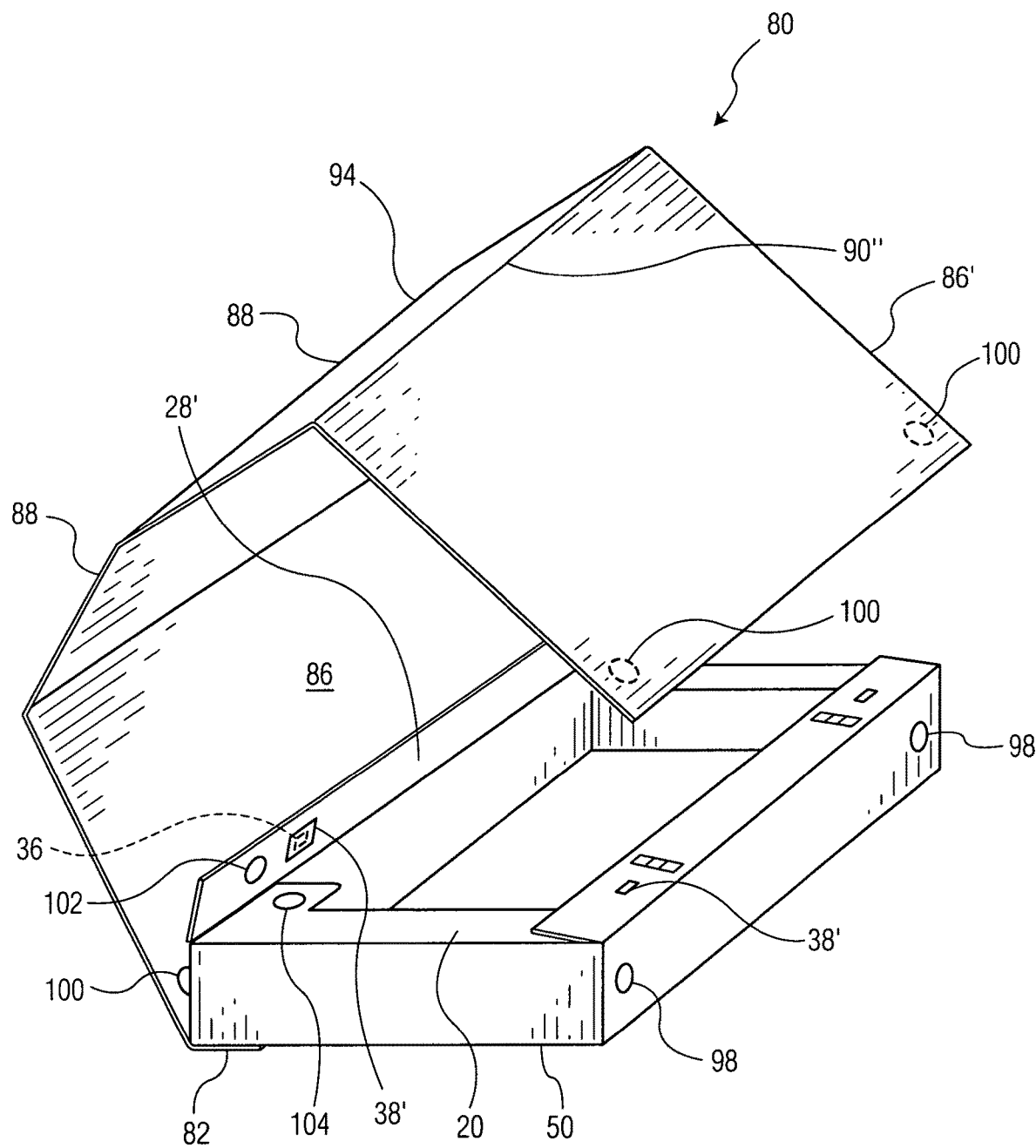
FIG. 10—Additional Securing Device Embodiments for Box & Hood.

FIG. 10, illustrates said attachable hood 80 securing devices second embodiment, comprising hook and loop male/female fastening tape 98 mounted to a predetermined position on the outside vertical side walls surface 26 of cat litter box 50 adapted to interlock and unlock with the opposing hook and loop male/female fastening tape 100 mounted to a predetermined position on the inside vertical side walls surface 86/86' of attachable hood 80. FIG. 10, also illustrates said disposable cat litter box 50 securing devices second embodiment, comprising hook and loop male/female fastening tape 102 mounted to a predetermined position on the upper side wall members inside surface 28' of cat litter box 50 adapted to interlock and unlock with opposing hook and loop male/female fastening tape 104 mounted to a predetermined position on the upper end wall members outside surface 20 of disposable cat litter box 50.

I claim:

1. A disposable cat litter box system, convertible from an open cat litter box to a covered cat litter box, comprising:
   a) a disposable cat litter box, comprising:
      a1) a one or more piece, die-cut and fold-line creased, waterproof protected flat paper board or plastic blank erected into said disposable cat litter box including a bottom wall extending horizontally to edges of the bottom comprising transversal fold-lines and longitudinal fold-lines;
      a2) a plurality of vertical end walls integral to the horizontal bottom wall, each vertical end wall having an integral or attached horizontal, or approximately horizontal upper end wall member and end wall securing devices, and an end wall fold-line scored between each vertical end wall and a respective one of the upper end wall members, wherein the bottom wall transversal fold-lines are scored between the horizontal bottom wall and the vertical end walls;
      a3) a plurality of vertical side walls integral to the horizontal bottom wall, each vertical side wall having an integral or attached horizontal or approximately horizontal upper side wall member and side wall securing devices, a side wall fold-line scored between the side wall and the upper side wall member, wherein the horizontal bottom wall longitudinal fold-lines are scored between the horizontal bottom wall and the vertical side walls;
      a4) corner end flaps integral with the vertical side walls and corner end flaps securing devices, wherein each of the corner end flaps has a corner end flap transversal fold-line scored between the corner end flap and a respective vertical side wall, and one or more die-cuts between each of the corner end flaps and a respective vertical side wall;
   b) an attachable hood for covering the open cat litter box, comprising:
      b1) a predetermined sized fold-line creased paperboard or plastic flat blank configured to be erected into said attachable hood;
      b2) means to cover the open cat litter box, comprising an integral upward extending vertical side wall that is integral with a horizontal top wall that is integral with a downward extending opposing vertical side wall;
      b3) means to secure the attachable hood to the open cat litter box, comprising a horizontal inwardly extending bottom locking flap integral with said upward extending vertical side wall and one or more spreadable tension locking devices, wherein said one or more spreadable tension locking devices press and secure said hood opposing vertical side walls against the cat litter box opposing vertical side walls;

b4) wherein the attachable hood is configured to fold-away and be secured to an outer side of the disposable cat litter box, wherein the attachable hood is folded along fold-line creases integral with the attachable hood, and said one or more spreadable tension locking devices is configured to secure said integral upward extending vertical side wall of said attachable hood and said downward extending opposing vertical side wall of said attachable hood against the outer side of the cat litter box.

2. The disposable cat litter box system as defined in claim 1, further comprising:

c) said horizontal bottom locking flap extending inwardly under one side of the litter filled cat litter box;

d) a longitudinal outwardly-bendable crease in a predetermined position on the outside of the upward extending vertical side wall;

f) said horizontal top wall comprising an integral approximately centrally positioned, longitudinal fold-line crease extending the length of said top wall;

g) an integral longitudinal fold-line crease between said upward extending vertical side wall and the horizontal top wall;

i) an integral longitudinal fold-line crease between said horizontal top wall and said downward extending extending vertical side wall.

3. The disposable cat litter box system as defined in claim 1, wherein said securing devices spreadable tensioned locking device comprise one or more spreadable elastic bands.

4. Said disposable cat litter box system as defined in claim 1, wherein the securing devices comprise open and closing interlocking tabs, adapted to interlock or unlock with opposing interlocking slots to open and close the disposable cat litter box.

5. The disposable cat litter box system according to claim 2, wherein said, horizontal top wall centrally positioned longitudinal fold-line crease, is folded approximately in-half into two integral longitudinal sections when folding-away said top wall to the outer side of the cat litter box.

6. The disposable cat litter box system according to claim 2 wherein said folded attachable hood comprises the longitudinal outwardly-bendable crease, positioned on the outside of said upward extending vertical side wall, whereby when bent outwardly at said crease, opens an area adjacent to the outer side wall of the cat litter box.

7. A disposable cat litter box system according to claim 6 wherein said hood folded walls inserted and secured against said outer side wall of the cat litter box, comprises an approximately vertical orientation when pressed against a stationary room wall, or other stationary room object, whereby saving room space.

8. A disposable cat litter box system, comprising:

a) a disposable cat litter box, comprising:

a1) a one or more piece, die-cut and fold-line creased, waterproof protected flat paper board or plastic blank erected into said disposable cat litter box including a bottom wall extending horizontally to edges of the bottom comprising transversal fold-lines and longitudinal fold-lines;

a2) a plurality of vertical end walls integral to the horizontal bottom wall, each vertical end wall having and integral or attached horizontal, or approximately horizontal upper end wall member and end wall securing devices, and an end wall fold-line scored between each vertical end wall and a respective one of the upper end wall members, wherein the bottom wall transversal fold-lines are scored between the horizontal bottom wall and the vertical end walls;

a3) a plurality of vertical side walls integral to the horizontal bottom wall, each vertical side wall having an integral or attached horizontal or approximately horizontal upper side wall member and side wall securing devices, a side wall fold-line scored between the side wall and the upper side wall member, wherein the horizontal bottom wall longitudinal fold-lines are scored between the horizontal bottom wall and the vertical side walls;

a4) corner end flaps integral with the vertical side walls and corner end flaps securing devices, wherein each of the corner end flaps has a corner end flap transversal fold-line scored between each the corner end flap and a respective vertical side wall, and one or more die-cuts between each of the corner end flaps and a respective vertical side wall;

b) one or more integral air treating devices, each device comprising:

b1) a predetermined sized access opening in a predetermined area of said upper side and/or upper end wall member of the disposable cat litter box;

b2) said predetermined sized access opening goes completely through said upper wall member;

b3) a predetermined sized absorbent material larger in size than the access opening is mounted to the inside surface area of said upper wall member covering the access opening;

b4) an adhering adhesive secures the predetermined sized absorbent material to the inside surface of the upper wall member.

9. The disposable cat litter box system according to claim 8, comprising:

e) said air treating device absorbent material is positioned in a predetermined location between the upper side wall member and the upper end wall member, whereby said absorbent material is not exposed to the exterior or interior of the cat litter box, preventing a cat from ripping, scratching, or dislodging the absorbent material when entering or exiting the cat litter box, or when digging, or burying in the cat litter box or scratching inside the box.

10. A method of opening and closing one end of the disposable cat litter box as defined in claim 8 to empty out the used cat litter into a trash receptacle, then reclose and refill the disposable cat litter box with new cat litter, the method comprising:

a) providing said disposable cat litter box comprising one or both end walls interlocked securing device tabs and slots not in contact with the used cat litter;

a1) said disposable cat litter box comprising both corner end flaps securing device tabs interlocked with both opposing corner end flaps securing device slots in a predetermined area between said corner end flaps and the adjacent end walls, with the corner end flaps sides adjacent to the end walls not in contact with the used cat litter; and c) slipping said trash receptacle around one end of the used litter filled cat box prior to unlocking and opening said one end wall, and adjacent corner end flaps securing device; then d) unlocking one or both end walls securing devices not in contact with the used cat litter to relieve stress from the heavy moisture impregnated used litter and said one end corner end flaps securing device; then e) positioning outward at the unlocked end of the cat litter box said unlocked end wall, and said unlocked corner end flaps into a three-sided shaped discharge chute, comprising the end wall being the bottom wall of the chute and the corner end flaps being the opposing side walls of the chute; then f) pouring out the used cat litter from the cat litter box down the shaped discharge chute into said trash receptacle to empty out the cat litter box; then g) reclosing the cat litter box unlocked end, comprising interlocking said opposing unlocked corner end flaps securing devices and interlocking said one or both end walls upper end wall securing devices; then h) refilling the reclosed cat litter box with new cat litter to reuse the cat litter box.

11. The disposable cat litter box system as defined in claim 8, wherein said air treating devices are non-powered, wherein when said air treating devices are liquid dosed with a cat remedy product or cat box odor eliminator, their evaporating fragrance or aroma treats the air above the cat litter.

12. The disposable cat litter box system as defined in claim 8, wherein said air treating devices access openings are vertically or approximately vertically oriented, whereby a liquid product can be accurately dispensed from a container vertically or approximately vertically into said access openings from above.

13. A method of using the disposable cat litter box system, as defined in claim 8, to remove the cat box odors from above the used cat litter and not in it, the method comprises:
 a) providing said disposable cat litter box system, comprising one or more air treating devices positioned in a predetermined location on the top of the disposable cat litter box, higher than the used cat litter;
 b) dispensing from a container, one or more drops of a cat box odor eliminator product into one or more air treating devices, whereby the evaporating fragrance or aroma removes the cat box odors above the used cat litter;
 c) policing said used cat litter in the disposable cat litter box;
 d) monitoring the cat box odors above the cat litter daily, or when servicing the cat litter box, or as needed, whereby determining the liquid dosing regimen for dispensing the cat box odor eliminator product into the one or more air treating devices to continue to remove cat box odors from above the used cat litter as the litter gets older;
 e) continuing the methods b, c, and d, until the disposable cat litter box is put into a trash receptacle.

14. A disposable cat litter box system, comprising:
 a) a disposable cat litter box, comprising:
  a1) a one or more piece, die-cut and fold-line creased, waterproof protected flat paper board or plastic blank erected into said disposable cat litter box including a bottom wall extending horizontally to edges of the bottom comprising transversal fold-lines and longitudinal fold-lines;
  a2) a plurality of vertical end walls integral to the horizontal bottom wall, each vertical end wall having and integral or attached horizontal, or approximately horizontal upper end wall member and end wall securing devices, and an end wall fold-line scored between each vertical end wall and a respective one of the upper end wall member, wherein the bottom wall transversal fold-lines are scored between the horizontal bottom wall and the vertical end walls;
  a3) a plurality of vertical side walls integral to the horizontal bottom wall, each vertical side wall having an integral or attached horizontal or approximately horizontal upper side wall member and side wall securing devices, a side wall fold-line scored between the side wall and the upper side wall member, wherein the horizontal bottom wall longitudinal fold-lines are scored between the horizontal bottom wall and the vertical side walls;
  a4) corner end flaps integral with the vertical side walls and corner end flaps securing devices, wherein each of the corner end flaps has a corner end flap transversal fold-line scored between the corner end flap and a respective vertical side wall, and one or more die-cuts between each of the corner end flaps and a respective vertical side wall;
 b) one or more integral air treating devices, each device comprising:
  b1) a predetermined sized access opening in a predetermined area of said upper side and/or upper end wall member of the disposable cat litter box;
  b2) said predetermined sized access opening goes completely through said upper wall member;
  b3) a predetermined sized absorbent material larger in size than the access opening is mounted to the inside surface area of said upper wall member covering the access opening;
  b4) an adhering adhesive secures the predetermined sized absorbent material to the inside surface of the upper wall member;
 c) an attachable hood for covering the open cat litter box, comprising:
  c1) a predetermined sized fold-line creased paperboard or plastic flat blank configured to be erected into said attachable hood;
  c2) means to cover the open cat litter box, comprising an integral upward extending vertical side wall that is integral with a horizontal top wall that is integral with a downward extending opposing vertical side wall;
  c3) means to secure the attachable hood to the open cat litter box, comprising a horizontal inwardly extending bottom locking flap integral with said upward extending vertical side wall and one or more spreadable tension locking devices, wherein said one or more spreadable tension locking devices press and secure said hood opposing vertical side walls against the cat litter box opposing vertical side walls;
  c4) wherein the attachable hood is configured to fold-away and be secured to an outer side of the disposable cat litter box, wherein the attachable hood is folded along fold-line creases integral with the attachable hood, and said one or more spreadable tension locking devices is configured to secure said integral upward extending vertical side wall of said attachable hood and said downward extending opposing vertical side wall of said attachable hood against the outer side of the cat litter box.

15. The disposable cat litter box system as defined in claim 14, wherein each air treating device is located between a transversal edge of the upper side wall member and the nearest upper side wall member securing device, whereby a pet owner can liquid dose said air treating device with a cat box odor eliminator or cat remedy product from either open end of the attached hood.

16. A method of using the disposable cat litter box system, as defined in claim 14, to remove from the disposable cat litter box the cat box odors above the used cat litter and not in it, the method comprising:
- a) providing said disposable cat litter box system, comprising one or more air treating devices, positioned in a predetermined location on the top of the disposable cat litter box that is within a reusuable attached hood;
  - a1) each air treating device further comprises being positioned between a transversal edge of an upper side wall member of the disposable cat litter box and the nearest upper side wall member securing device, whereby a pet owner can dispense said liquid into said air treating device without having to adjust or remove the attached hood;
  - a2) said air treating devices are positioned higher than the top of the used cat litter, whereby the cat box odor eliminator product evaporating fragrance or aroma treats the air above the used cat litter and removes the cat box odors;
- b) monitoring the cat box odors from the used cat litter, whereby determining the liquid dosing regimen for dispensing the cat box odor eliminator product into the one or more air treating devices as the used cat litter gets older;
- c) dispensing one or more drops of said liquid cat box odor eliminator product into one or more said air treating devices;
- d) continuing the methods b, and c, until the disposable cat litter box is put into a trash receptacle, and the reusuable attached hood is used with the new disposable cat litter box;
- e) setting-up a new disposable cat litter box system, as defined in claim 14.

17. A method of using the disposable cat litter box system, as defined in claim 14, to police the used cat litter from the top of the open cat litter box, the method comprises:
- a) providing an attached hood, comprising a horizontal bottom locking flap and a spreadable tensioned locking device secured to the used litter filled disposable cat litter box;
- b) spreading the tensioned locking device away from the attached hood side wall opposite the hood side wall integral with the horizontal bottom locking flap;
- c) raising the untensioned hood side wall above the spreadable tension locking device;
- d) bending an outwardly bendable crease in the hood outer side wall that is integral with the horizontal bottom locking flap, bends said side wall outwardly at said crease, away from the adjacent outer side wall of the disposable cat litter box to create a space between said hood side wall and said outer side wall of the disposable cat litter box;
- e) folding the untensioned hood side wall and bi-folded hood top wall and re-positioning said both hood folded walls to the outer side of the disposable cat litter box;
- f) inserting and securing the hood folded walls into the space between the hood side wall integral with the horizontal bottom locking flap and the outer side wall of the disposable cat litter box, whereby exposing the top of the used litter filled disposable cat litter box;
- g) policing the used litter from the top of the open cat litter box;
- h) removing the inserted and secured hood folded walls from said space and unfolding and re-positioning said hood walls back over the disposable cat litter box;
- j) re-securing said untensioned hood side wall to the disposable cat litter box.

18. A disposable cat litter box system, comprising:
- a) a disposable cat litter box, comprising:
  - a1) a one or more piece, die-cut and fold-line creased, waterproof protected flat paper board or plastic blank erected into said disposable cat litter box including a bottom wall extending horizontally to edges of the bottom comprising transversal fold-lines and longitudinal fold-lines;
  - a2) a plurality of vertical end walls integral to the horizontal bottom wall, each vertical end wall having and integral or attached horizontal, or approximately horizontal upper end wall member, comprising hook and loop fasteners locking devices, and an end wall fold-line scored between each vertical end wall and a respective one of the upper end wall member, wherein the bottom wall transversal fold-lines are scored between the horizontal bottom wall and the vertical end walls;
  - a3) a plurality of vertical side walls integral to the horizontal bottom wall, each vertical side wall having an integral or attached horizontal or approximately horizontal upper side wall member comprising hook and loop fasteners locking devices, and a side wall fold-line scored between the side wall and the upper side wall member, wherein the horizontal bottom wall longitudinal fold-lines are scored between the horizontal bottom wall and the vertical side walls;
  - a4) a plurality of hook and loop fasteners locking devices attached to a predetermined position on the opposing outer vertical side walls of the disposable cat litter box, whereby said locking devices interlock with opposing hook and loop fasteners locking devices on opposing inner vertical side walls of an attachable hood;
  - a5) corner end flaps integral with the vertical side walls and corner end flaps hook and loop fasteners locking devices, wherein each of the corner end flaps has a corner end flap transversal fold-line scored between the corner end flap and a respective vertical side wall;
- b) one or more integral air treating devices, each device comprising:
  - b1) a predetermined sized access opening in a predetermined area of said upper side and/or upper end wall member of the disposable cat litter box;
  - b2) said predetermined sized access opening goes completely through said upper wall member;
  - b3) a predetermined sized absorbent material larger in size than the access opening is mounted to the inside surface area of said upper wall member covering the access opening;
  - b4) an adhering adhesive secures the predetermined sized absorbent material to the inside surface of the upper wall member;
- c) an attachable hood for covering the open cat litter box, comprising:
  - c1) a predetermined sized fold-line creased paperboard or plastic flat blank configured to be erected into said attachable hood;
  - c2) means to cover the open cat litter box, comprising an integral upward extending vertical side wall that is integral with a horizontal top wall that is integral with a downward extending opposing vertical side wall;

c3) means to secure the attachable hood to the open cat litter box, comprising a horizontal inwardly extending bottom locking flap integral with said upward extending hood vertical side wall and hook and loop fasteners locking devices, positioned in a predetermined location on the inner side of the hood opposing vertical side walls, whereby interlocking said hood vertical side walls to said hook and loop fasteners locking devices located in said predetermined position on the opposing outer vertical side walls of the disposable cat litter box;

c4) wherein the attachable hood is configured to fold-away and be secured to an outer side of the disposable cat litter box, wherein the attachable hood is folded along fold-line creases integral with the attachable hood, and wherein said hook and loop fasteners locking devices are configured to secure said integral upward extending vertical side wall of said attachable hood against said outer side of the cat litter box.

\* \* \* \* \*